(12) United States Patent
Karst

(10) Patent No.: US 8,870,519 B2
(45) Date of Patent: Oct. 28, 2014

(54) CARTON FEEDING SYSTEM

(75) Inventor: Pete Karst, Woodstock, GA (US)

(73) Assignee: Graphic Packaging International, Inc., Atlanta, GA (US)

( * ) Notice: Subject to any disclaimer, the term of this patent is extended or adjusted under 35 U.S.C. 154(b) by 105 days.

(21) Appl. No.: 13/231,137

(22) Filed: Sep. 13, 2011

(65) Prior Publication Data

US 2013/0064636 A1 Mar. 14, 2013

(51) Int. Cl.
   *B65H 3/08* (2006.01)
   *B65G 59/02* (2006.01)
   *B65G 59/06* (2006.01)
   *B65G 47/08* (2006.01)

(52) U.S. Cl.
   CPC ............... *B65G 47/08* (2013.01); *B65G 59/06* (2013.01)
   USPC ...................... 414/797; 414/797.3; 414/796.4; 414/798.5

(58) Field of Classification Search
   USPC ............. 414/797, 795.4, 796.4, 796.5, 796.9, 414/797.3, 798.5, 801
   See application file for complete search history.

(56) References Cited

U.S. PATENT DOCUMENTS

| | | | |
|---|---|---|---|
| 3,575,409 A | 4/1971 | Calvert | |
| 3,981,494 A | 9/1976 | Prestegaard | |
| 4,034,658 A | 7/1977 | Sherman | |
| 4,244,281 A | 1/1981 | Kauffman et al. | |
| 4,331,434 A * | 5/1982 | Buschor | 493/67 |
| 4,582,315 A | 4/1986 | Scarpa et al. | |
| 4,802,664 A | 2/1989 | Larsen | |
| 4,881,934 A | 11/1989 | Harston et al. | |
| 4,986,522 A * | 1/1991 | Paulson | 271/2 |
| 5,019,029 A | 5/1991 | Calvert | |
| 5,102,385 A | 4/1992 | Calvert | |
| 5,102,485 A * | 4/1992 | Keeler et al. | 156/256 |
| 5,176,612 A | 1/1993 | Calvert et al. | |
| 5,254,071 A | 10/1993 | Laroche | |
| 5,282,528 A | 2/1994 | Hudson | |
| 5,632,368 A | 5/1997 | Moncrief | |
| 5,653,671 A | 8/1997 | Reuteler | |
| 5,657,610 A | 8/1997 | Dietrich et al. | |
| 5,662,577 A | 9/1997 | Reuteler | |
| 5,997,458 A | 12/1999 | Guttinger et al. | |
| 6,050,063 A | 4/2000 | Ford et al. | |
| 6,073,423 A | 6/2000 | House | |

(Continued)

OTHER PUBLICATIONS

International Search Report and Written Opinion for PCT/US2012/053595 mailed Jan. 30, 2013.

*Primary Examiner* — Gregory Adams
*Assistant Examiner* — Lynn Schwenning
(74) *Attorney, Agent, or Firm* — Womble Carlyle Sandridge & Rice, LLP

(57) ABSTRACT

A carton feeding system is provided for feeding selected cartons from a stack of cartons contained within a carton magazine to a downstream carton conveyor such as for a product packaging machine. A carton picking device removes a selected carton from the stack of cartons within the magazine, after which the carton is engaged between a carton engaging segment of the primary segment wheel and a draw roller, which pulls the carton from the magazine and feeds the carton along a first path of travel. Thereafter, a secondary segment wheel engages and redirects a leading portion of the carton toward a second path of travel. The carton then is fed along its second path of travel toward engagement between a pair of downstream nip rolls that feed the carton into the downstream carton conveyor.

27 Claims, 8 Drawing Sheets

(56) References Cited

U.S. PATENT DOCUMENTS

| | | | |
|---|---|---|---|
| 6,146,028 A * | 11/2000 | Preszler | 396/575 |
| 6,213,286 B1 | 4/2001 | Hunter et al. | |
| 6,311,457 B1 | 11/2001 | May et al. | |
| 6,490,843 B1 | 12/2002 | May | |
| 6,509,052 B1 * | 1/2003 | Benham et al. | 426/512 |
| 6,550,608 B1 | 4/2003 | Brown et al. | |
| 6,993,889 B2 | 2/2006 | Ford et al. | |
| 7,070,551 B2 * | 7/2006 | Lasson | 492/56 |
| 7,461,838 B2 * | 12/2008 | Hendricks et al. | 271/5 |
| 7,695,421 B2 | 4/2010 | Ford | |
| 2002/0041067 A1 | 4/2002 | Muller | |
| 2006/0037290 A1 * | 2/2006 | Smith | 53/566 |
| 2008/0227612 A1 | 9/2008 | Harston | |

* cited by examiner

CARTON FEEDING SYSTEM

FIELD OF THE INVENTION

The present invention generally relates to carton feeding systems, and in particular to a carton feeding system for feeding a series of flat carton blanks stacked in a magazine to the lugs of a downstream carton conveyor for a packaging machine or similar system.

BACKGROUND OF THE INVENTION

In a typical carton feeding system for feeding flat carton blanks or sleeves, the stacks of cartons generally are loaded in stacks into a magazine and thereafter are individually picked from the magazine for feeding to a downstream carton conveyor. In particular, for flat, wrap style cartons, which are designed and/or adapted to be folded about groups of articles such as bottles, cans, or other, similar articles arranged in groups of two, four, six, twelve, etc., the cartons generally will be fed in a substantially flat lying attitude into a position whereby the cartons will be engaged by a series of lugs moving along the downstream carton conveyor. The lugs of the downstream carton conveyor convey the flat-blank, wrap style cartons along the carton conveyor for feeding into a packaging machine or similar system for wrapping of the cartons about the groups of articles.

In many conventional carton feeders, the cartons are pulled forwardly and out of the magazine by a vacuum cup or similar suction device, and are fed between a pair of feed rollers, which pull the cartons forwardly and out of the magazine and feed them along a path of travel. However, with such conventional carton feeders, the cartons generally can only be fed in a substantially straight path of travel, extending through a pick point or engagement point between the feed rollers and to the input end of the downstream carton conveyor. Thus, the location of a downstream carton conveyor with respect to the carton feeder often is limited since the cartons generally must be fed in a substantially straight direction or path of travel extending substantially perpendicular to the pick point between the feeder wheel and the draw roller. As a result, such carton feeding systems generally are located or positioned in limited alignments that can require significant space or area for feeding of the cartons along their complete path of travel for consistently feeding the flat, wrap style cartons into the downstream carton conveyor.

Accordingly, it can be seen that a need exists for a carton feeding system that addresses the foregoing and other related and unrelated problems in the art.

SUMMARY OF THE INVENTION

Briefly described, the present invention generally relates to a carton feeding system for feeding cartons to a downstream carton conveyor for thereafter feeding the cartons into a packaging machine or other, similar system for application of the cartons to articles or groups of articles. In one embodiment, the carton feeding system generally is directed to the feeding of flat-blank, wrap style cartons that are adapted to be folded or wrapped about articles such as bottles, cans, etc., for forming wrapped product packages such as six-packs, twelve-packs, etc. However, it will be understood by those skilled in the art that the principles of the present invention could be applied for the feeding of various other types of cartons as needed or desired.

The carton feeding system generally includes a frame with a magazine arranged at the upstream end thereof for receiving and presenting a stack of cartons for feeding therethrough. At least one primary segment wheel generally is mounted adjacent the pick face or front of the magazine and typically includes one or more carton engaging segments defined about its circumference. The primary segment wheel is driven or rotated at a desired speed and direction for engaging and pulling selected cartons free of the magazine. A carton picking device, generally including at least one suction cup mounted to a pivoting arm, is movable into engagement with the leading carton of the stack of cartons within the magazine, with the suction cup being moved into and away from its engaging position in timed relation with the number and rotation of the carton engaging segments of the primary segment wheel into engagement with the cartons. For example, if there are two carton engaging segments arranged or formed about the primary segment wheel, the suction cup will be moved into engagement with the stack of cartons approximately two times per revolution of the primary segment wheel.

The suction cup of the carton picking device engages a portion of the leading/selected carton at the front of the stack of cartons within the magazine and thereafter, as the arm of the carton picking device is retracted, pulls the selected carton forwardly so that the leading portion of the selected carton is engaged by a leading edge of one of the carton segments of the primary segment wheel. As a result, the leading portion of the selected carton is drawn into a pick point between a carton engaging segment of the primary segment wheel and a draw roller adjacent the magazine. The engagement of the carton between the carton engaging segment of the primary segment wheel and its associated draw roller causes the selected carton to be pulled out of the magazine and directed along a first path of travel that extends in a direction substantially perpendicular to the pick point between the draw roller and carton engaging segment of the primary segment wheel.

A secondary segment wheel generally is located downstream from the draw roller, aligned with the first path of travel of the selected carton. The secondary segment wheel includes a carton engaging surface having leading and trailing ends and defining a gap or recessed area formed thereabout. The carton engaging surface generally is formed from or covered with a soft, non-stick material such as a urethane, rubber or other, suitable synthetic or composite material that generally will engage and pull the carton without damage or gouging of the carton. A pick edge is defined at the leading end of the gap or recessed area adjacent the carton engaging surface and will engage the leading portion of the carton as the carton is fed along its first path of travel between the carton engaging segment of the primary segment wheel and the draw roller. The engagement of the carton by the pick edge of the secondary segment wheel causes the leading portion of the carton to be redirected toward a second path of travel that extends at an angle away from the first path of travel. Thereafter, as the primary segment wheel continues to rotate, the carton is engaged between its carton engaging segment and the carton engaging surface of the secondary segment wheel so that the carton is redirected and pulled forwardly along its second path of travel.

The selected carton is fed by the primary and secondary segment wheels into a nip or pinch point between a pair of downstream pinch rollers, which will draw or pull the selected carton further forwardly along its second path of travel and feed the selected carton to the paper feed chains of the downstream carton conveyor. As they are fed to the carton conveyor, the cartons are engaged by carton feeder lugs of the paper feed chains, which will thereafter urge and transport the cartons along the carton conveyor and away from the carton feeding system. The carton feeding system of the present invention accordingly enables a change in direction of cartons fed from a carton magazine within a short space and with minimal additional parts. As a result, the carton feeding system length can be significantly decreased, enabling the carton feeding system to be located in a closer, more compact space with relation to a downstream packaging machine to which the cartons are to be fed, and the feeding of the cartons to the carton conveyor can be accomplished more efficiently.

Various objects, features and advantages of the present invention will become apparent to those skilled in the art upon a review of the following detailed description, when taken in conjunction with the accompanying drawings.

In addition, according to common practice, the various features of the drawings discussed below are not necessarily drawn to scale. Dimensions of various features and elements in the drawings may be expanded or reduced to more clearly illustrate the embodiments of the disclosure and therefore are for descriptive and illustrative purposes only and should not be taken as limiting the scope of the present invention.

DETAILED DESCRIPTION

Figure 1:
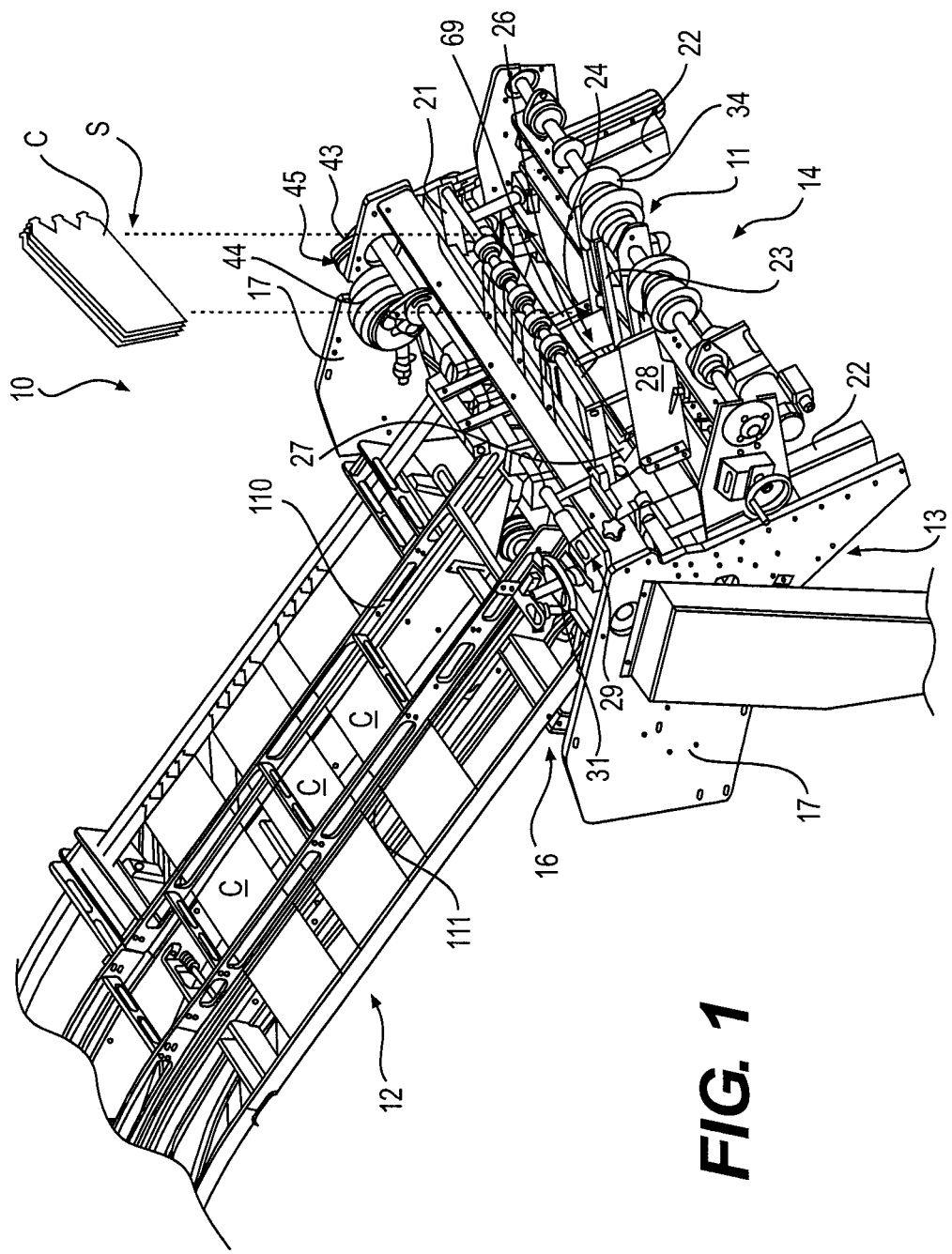
FIG. 1 is a perspective view illustrating one embodiment of the carton feeding system for feeding cartons to a downstream carton conveyor according to the principles of the present invention.

Referring now to the drawings in which like numerals indicate like parts throughout the several views, FIGS. 1-4E illustrate one embodiment of the carton feeding system 10 according to the principles of the present invention. The carton feeding system 10 is illustrated as a segmented wheel carton feeder for feeding flat-blank, wrap style cartons selected or picked from a stack of cartons S contained within a magazine 11 of the carton feeding system 10 individually to a downstream carton conveyor 12 for feeding the cartons into a downstream product packaging machine or similar apparatus. The carton feeding system 10 of the present invention further enables the change in direction of the cartons as they are individually fed from the magazine to the downstream carton conveyor within a significantly reduced space or area and with minimal added complexity and/or operating systems required for the operation of the carton feeding system.

Figure 2:
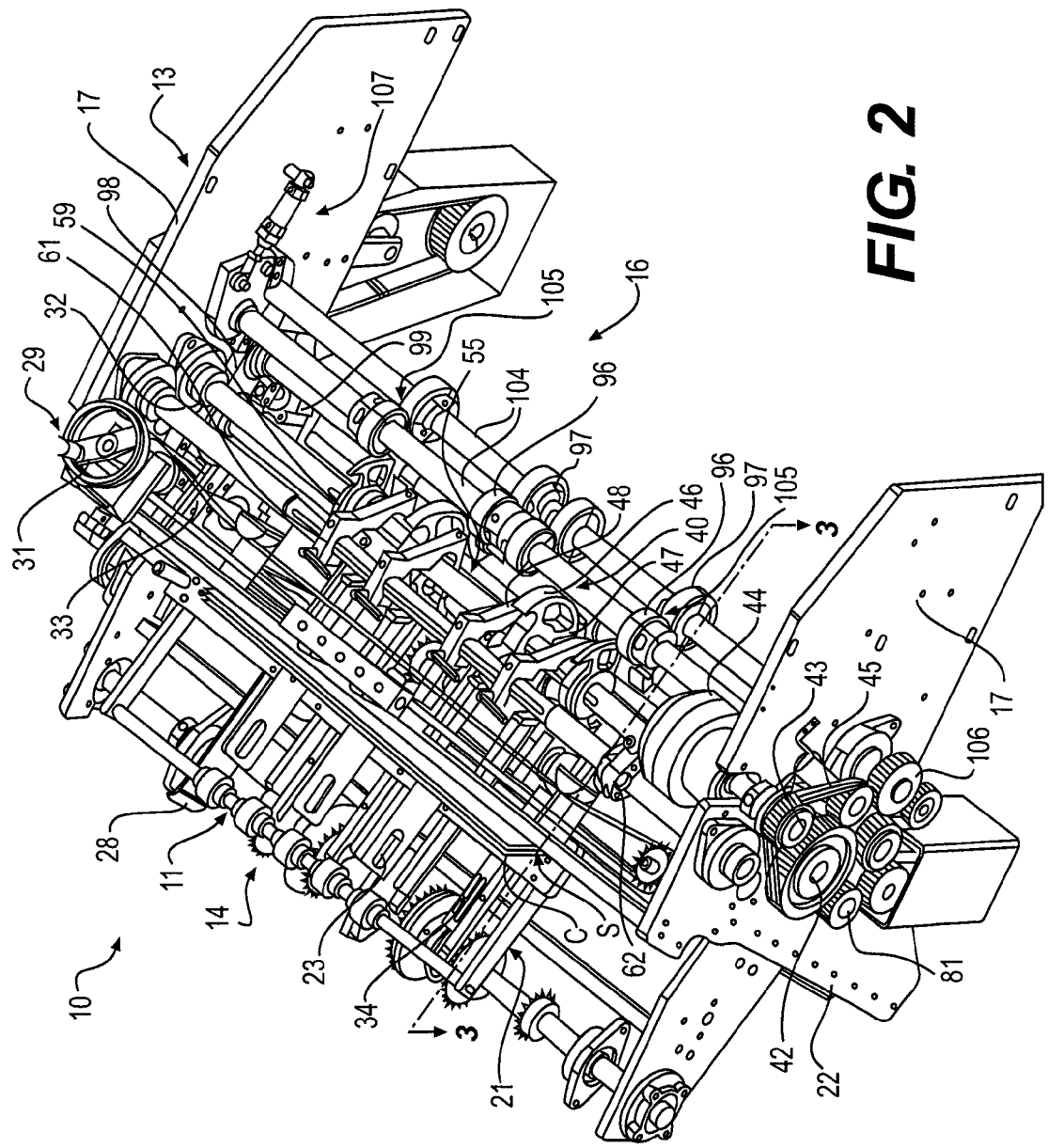
FIG. 2 is a perspective illustration of the embodiment of the carton feeding system of FIG. 1, with portions thereof being removed for clarity.
Figure 3:
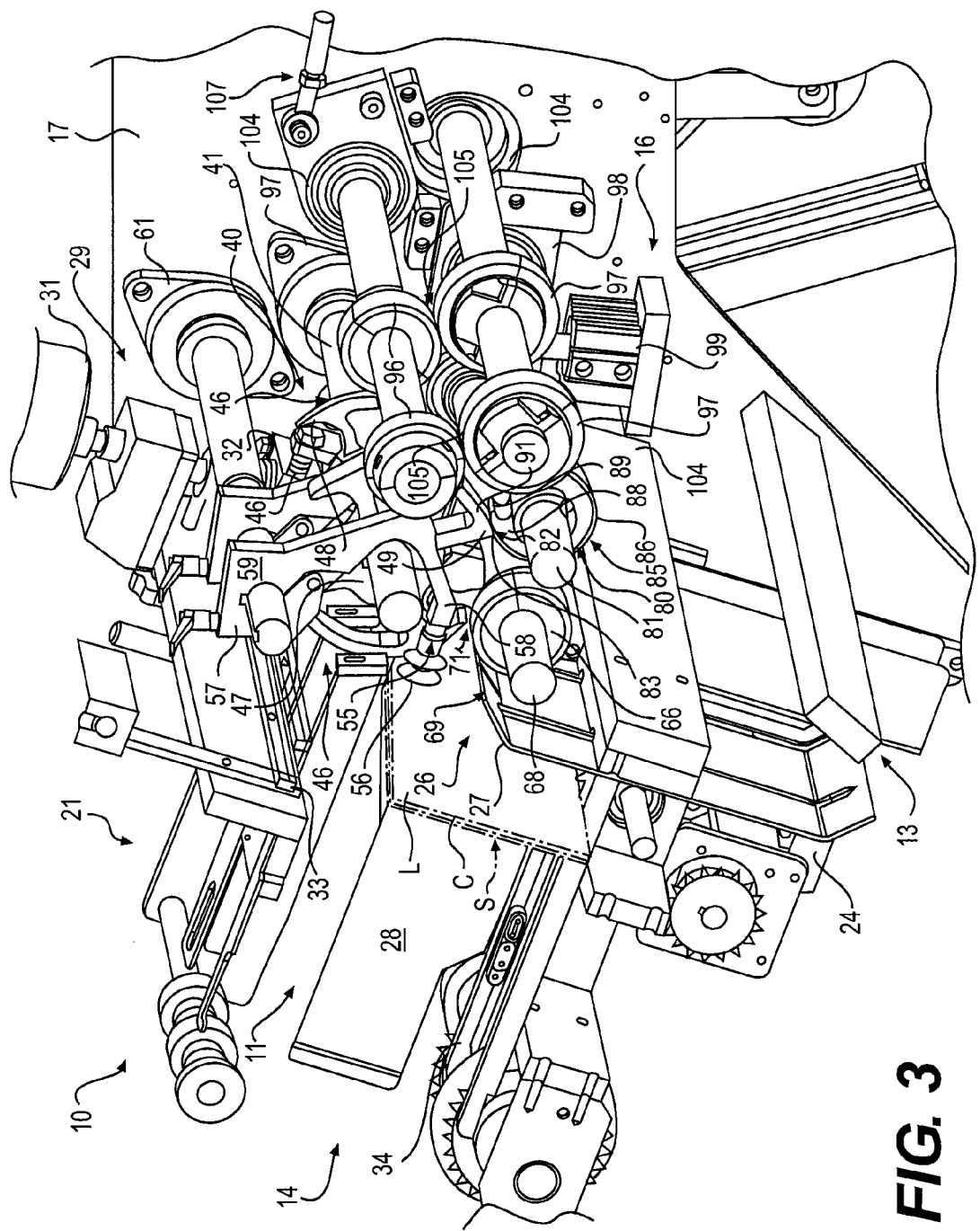
FIG. 3 is a cross-sectional view of the embodiment of the carton feeding system according to FIGS. 1 and 2, taken along lines 3-3 of FIG. 2.

As illustrated in FIGS. 1 and 2, the carton feeding system 10 includes a frame 13 having upstream and downstream ends 14 and 16, side frame members 17 supporting the operative elements of the carton feeding system therebetween. The magazine 11 is located at the upstream end 14 of the frame 13, and generally includes a magazine support frame 21 adjustably mounted on guide rods or rails 22 connected to the frame 13 of the carton feeding system, which enables vertical adjustment of the magazine support frame to accommodate different size cartons. The magazine additionally includes a series of supports or skids 23 on which the stack of cartons S will be received, with the cartons oriented in a forward facing, inclined attitude resting against a front guide plate 24 defining a pick face 26 for the magazine. As indicated in FIG. 3, the front guide plate generally is adjustably mounted to the magazine frame 21 so as to be moveable vertically with respect to the height of the stack of cartons, and further includes a forwardly sloped or slanted upper end 27 adapted to enable the cartons to bend or flex thereover for removal of the cartons from the stack of cartons, as indicated in FIGS. 4A-4D. At least one lateral guide plate 28 (FIGS. 1 and 3) further can be adjustably mounted to the magazine frame so as to be movable laterally thereacross to accommodate different length cartons and help ensure consistent stacking and feeding of the cartons from the magazine.

In addition, the magazine support frame can be adjusted laterally by an adjustment mechanism 29 (FIGS. 1 and 2), here shown as including a hand wheel or crank 31 that rotates drive gear 32, causing a drive belt 33, to which the magazine support frame is attached, to move laterally back and forth. This enables adjustment of the lateral position of the magazine, and thus the stack of cartons therein, with respect to the operative elements of the carton feeding system. One or more drive chains 34 further can be provided upstream of the magazine, and can engage the lower ends of the stack of cartons S for urging the stack of cartons forwardly and against the front guide plate 24 to ensure consistency in the picking and removal of each selected carton C individually from the stack.

As noted, the carton feeding system 10 is illustrated in one embodiment as comprising a segmented wheel carton feeder, which generally includes one or more primary segment wheels 40 mounted in spaced series along a central drive shaft 41. While a pair of primary segment wheels 40 generally are illustrated in the figures, it will be understood by those skilled in the art that a greater or fewer number of primary segment wheels also can be utilized as needed for feeding varying size cartons. As further indicated in FIG. 2, the drive shaft 41 on which the primary segment wheels are mounted can be connected to a central drive gear 42 that is in turn linked or connected to a drive gear 43 of a drive motor 44 by a drive belt 45 for driving the rotation of the primary segment wheels at a desired rate.

Each of the primary segment wheels 40 (FIGS. 3-4E) further generally will include one or more carton engaging segments 46 formed in spaced series about a central hub 47 through which the central drive shaft 41 extends. As illustrated in the figures, there typically will be at least two carton engaging segments formed about each of the primary segment wheels, although more or fewer carton engaging segments also can be used. Each of the carton engaging segments 46 generally will have a substantially arcuate construction having a rounded leading edge 48 adapted to engage and urge a leading portion L of the selected carton C as the selected carton is picked and removed from the magazine, as illustrated in FIGS. 4A-4E. Each carton engaging segment further generally will include a substantially smooth, non-stick and non-skid outer surface 49, such as a polished metal, synthetic or other, similar surface or coating applied thereto, adapted to engage the cartons without marring or damaging the finish thereof. The trailing ends 51 of each carton engaging segment 46 generally will be substantially flat and are spaced from the leading edge 48 of the following carton engaging segment 46, defining a recess or space 52 between each of the carton engaging segments 46.

Figure 4A:
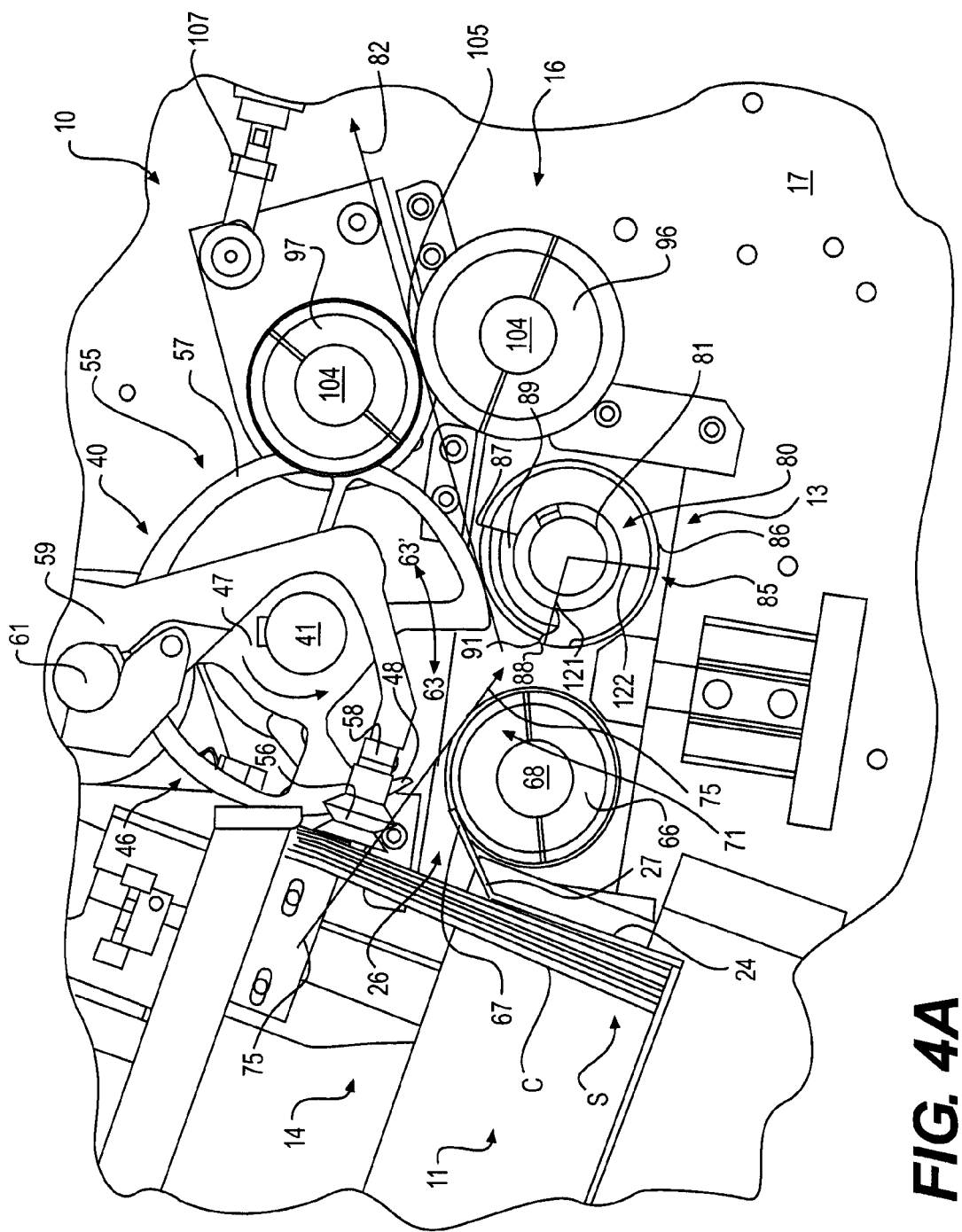
FIGS. 4A-4E are side elevational views, taken in partial cross-section, illustrating the operation of the carton feeding system for removing a selected carton from the magazine and thereafter redirecting the selected carton along a second path of travel for feeding to the downstream carton conveyor.
Figure 4B:
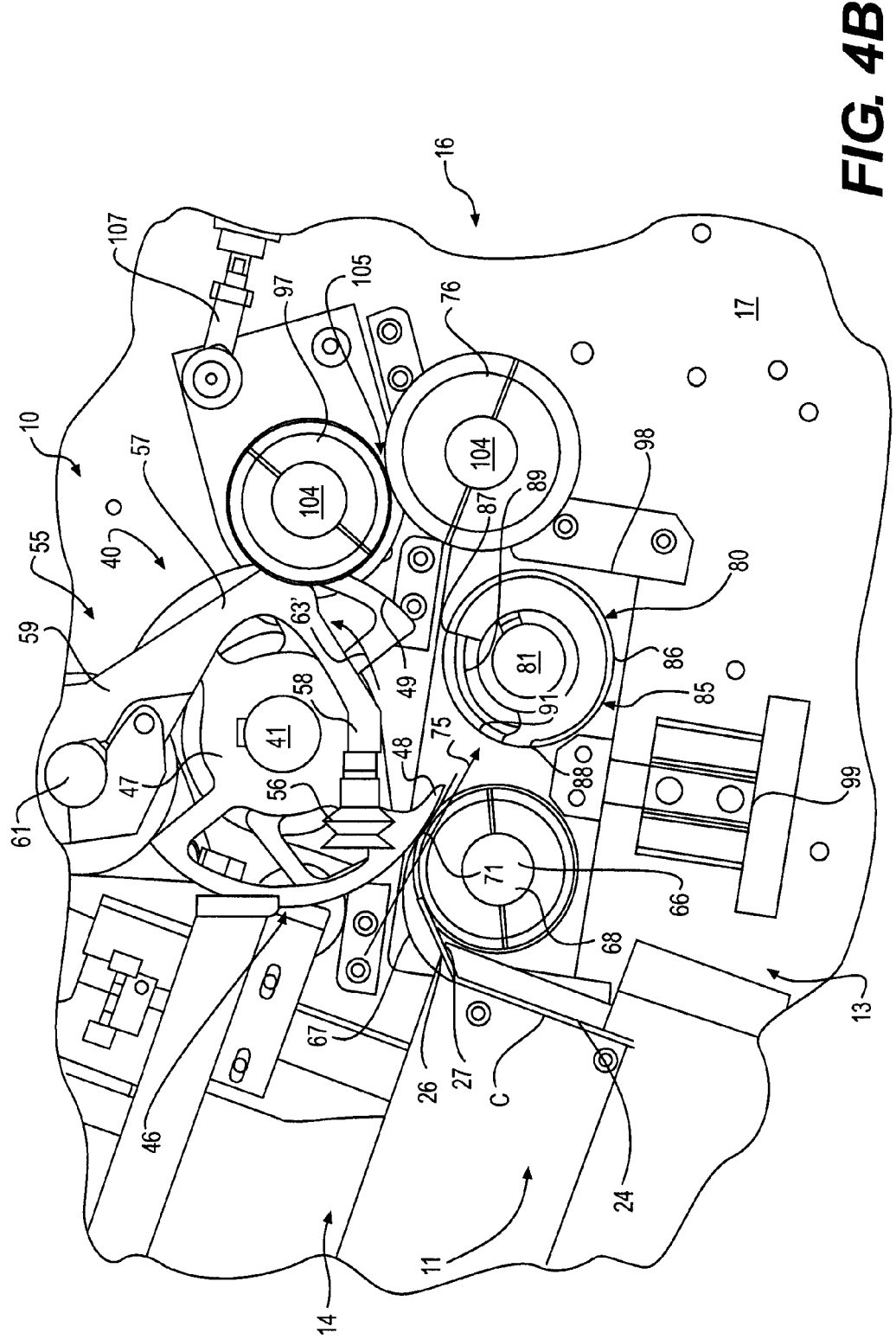

As illustrated in FIGS. 3-4B, a carton picking device 55 is provided for the picking and removal of the selected cartons C from the stack of cartons S contained within the magazine 11. Typically, the carton picking device 55 can include a vacuum or suction cup 56 connected to a vacuum supply (not shown) and mounted on a pivoting arm 57. As indicated in FIG. 2, multiple carton picking devices 55 can be mounted in spaced series across the width of the carton feeding system 10, positioned adjacent each of the primary segment wheels 40. The vacuum cups 56 are attached to the lower ends 58 of their support arms 57, while the upper ends 59 of the support arms will be fixedly mounted to a drive shaft 61 that extends across the width of the carton feeding system, as indicated in FIG. 2. The drive shaft 61 can be coupled to the drive shaft 41 for the primary segment wheels 40 by an eccentric mounting or linkage 62 (FIG. 2), which provides a reciprocating motion to the arm 57 of the carton picking devices 55. As a result, as indicated in FIGS. 4A and 4B, the suction or vacuum cups 56 of the carton picking devices are moved in a reciprocating, swinging motion into and out of engagement with the selected cartons of the stack of cartons.

As the vacuum cups engage the selected cartons, a vacuum is applied to the carton, after which the vacuum cups are retracted, pulling the leading portion L of the selected carton from the magazine as indicated in FIG. 4A. Typically, the reciprocation of the vacuum cups toward and away from engagement with the selected carton, indicated by arrows 63/63' in FIG. 4A, will be timed with the movement of the carton engaging segments of the primary segment wheels so that the leading portions of the cartons are pulled forwardly in front of the leading edges 48 of a carton engaging segment 46 of each of the primary segment wheels 40 as the primary segment wheels are rotated into engagement therewith. Additionally, the vacuum cups further generally will be reciprocated in a ratio based upon the number of carton engaging segments formed about the primary segment wheels. For example, for a primary segment wheel having two carton engaging segments formed thereabout, the vacuum cups of the carton picking devices will be reciprocated toward and away from the cartons two times for each single revolution of the primary segment wheels.

Figure 4C:
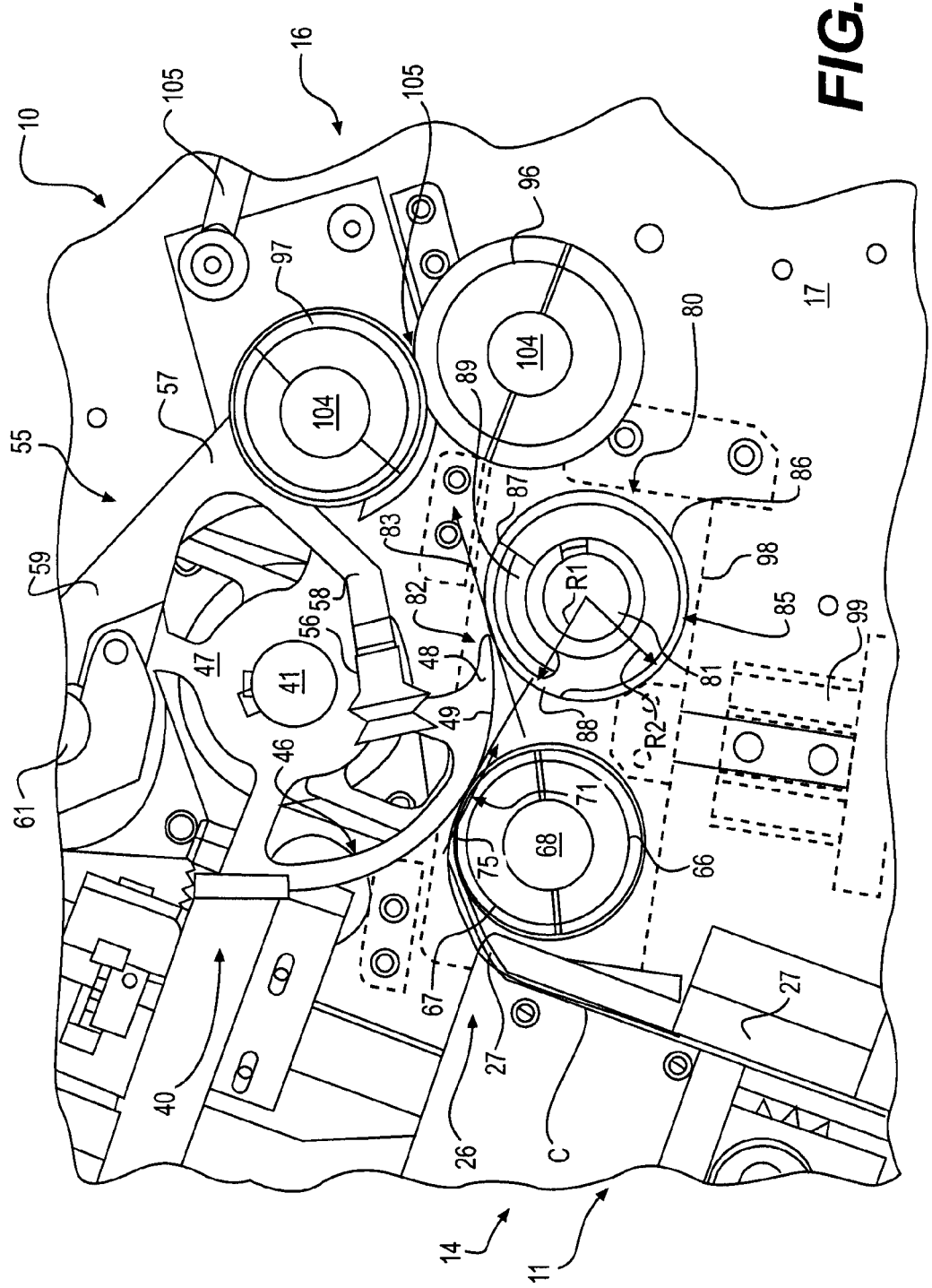
Figure 4D:
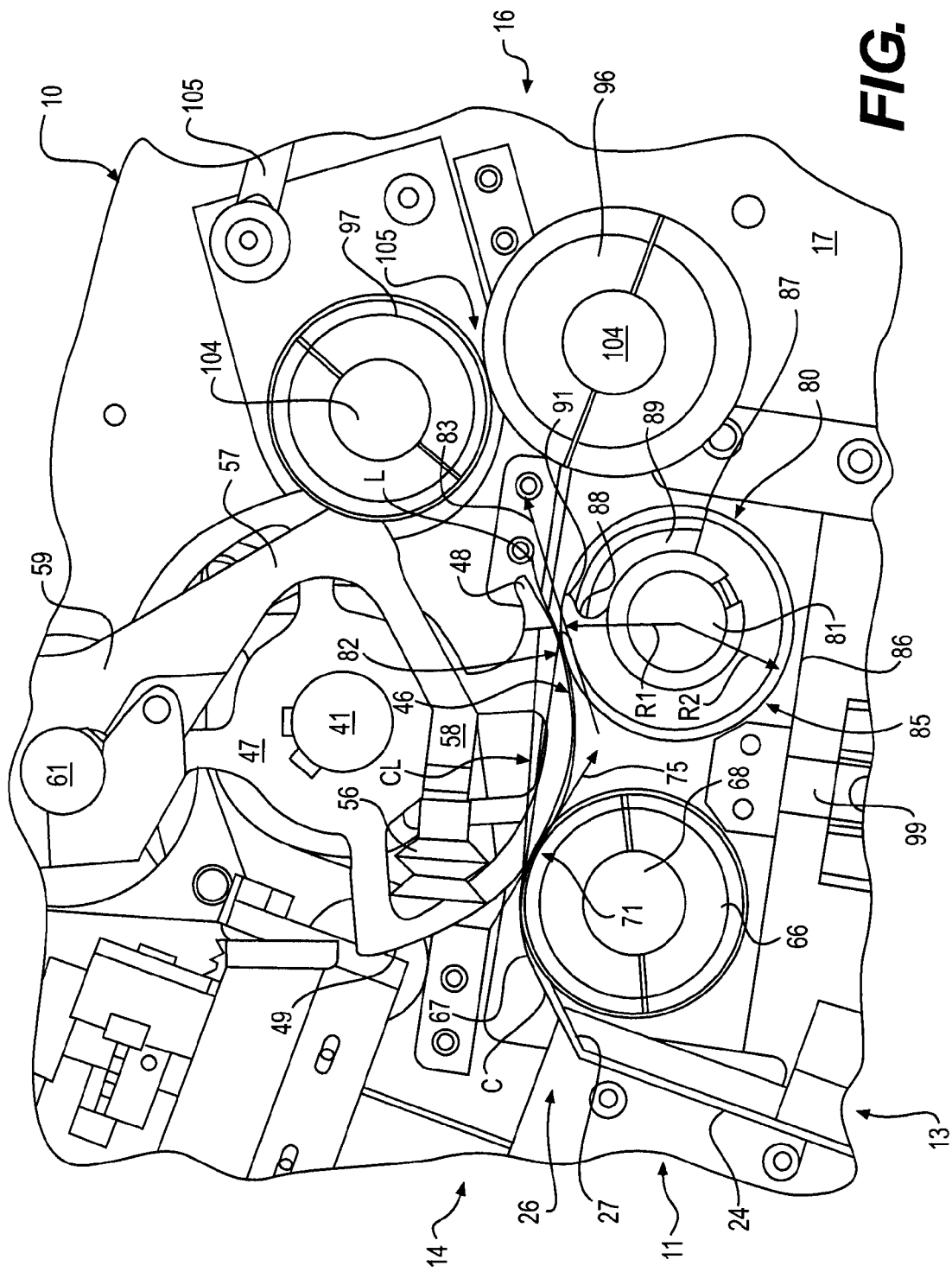
Figure 4E:
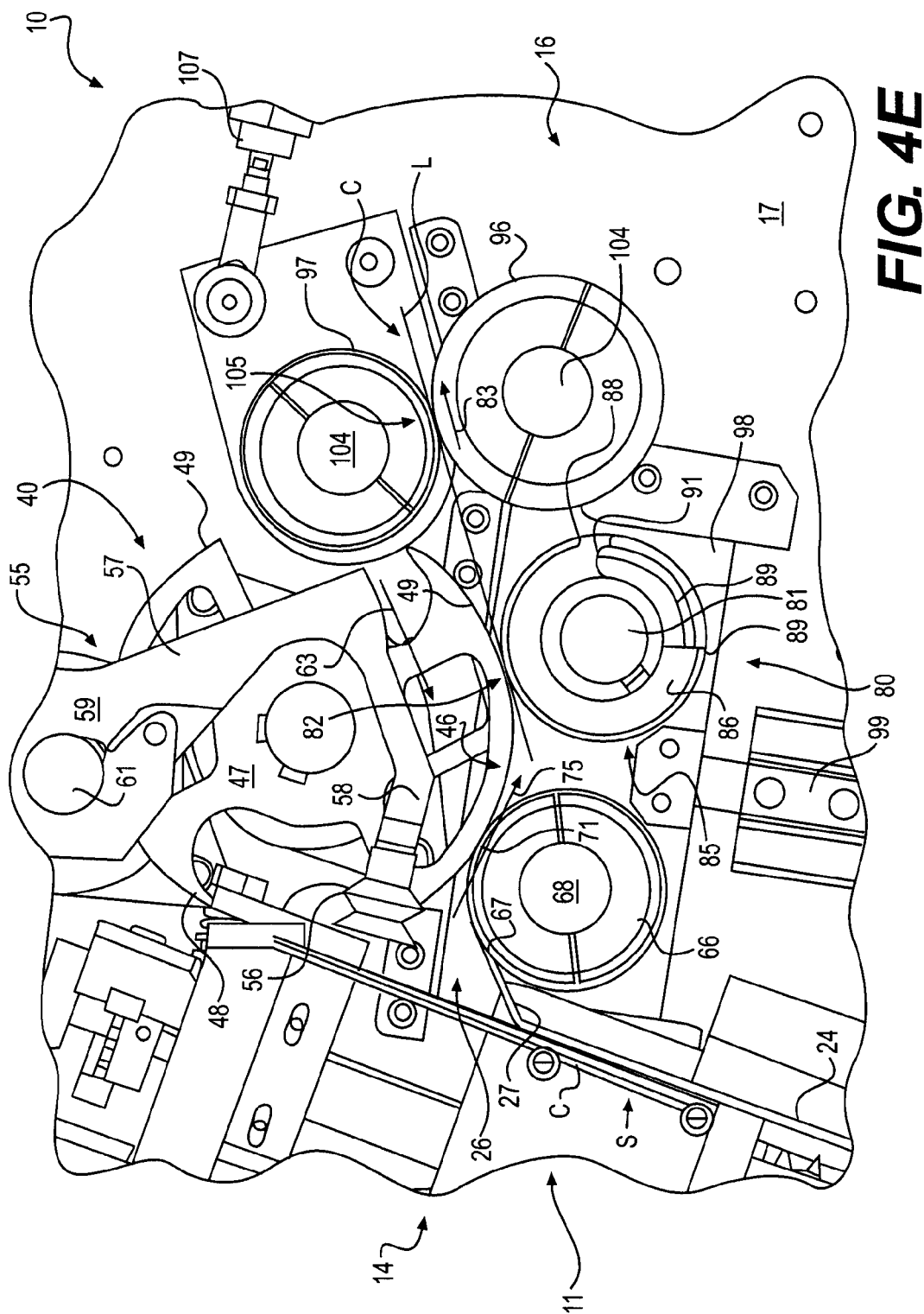

As further illustrated in FIGS. 3-4E, at least one draw roller 66 is mounted adjacent the terminal edge 67 of the angled upper end 26 of the front guide plate 24 of the magazine 11. Each draw roller 66 generally is mounted on an idler shaft 68 and can be aligned with slots or notches 69 (FIG. 3) formed in the terminal edge 67 of the magazine front guide plate. Each of the draw rollers 66 typically will be formed from or covered with a soft, tacky or gripping material, such as a urethane, rubber, or other, similar material that will enable the cartons to be engaged thereagainst without damage to the cartons. The draw rollers further each will be located in a position spaced below their associated primary segment wheels 40 so that the selected cartons will be engaged and drawn between the carton engaging segments 46 of the primary segment wheels 40 and their associated draw rollers 66 at a first pinch or draw point 71 defined at a tangent point between the surfaces thereof. As the carton engaging segments of the primary segment wheels rotate against the draw rollers, the draw rollers are correspondingly caused to rotate in conjunction therewith, and each selected carton accordingly is pulled from the magazine and is directed along a first path of travel 75. This first path of travel 75 generally extends downwardly at an angle between the carton engaging surfaces of the primary segment wheels and their draw rollers, passing through and extending substantially perpendicular to the first pinch or draw point 71 defined therebetween.

As shown in FIG. 2, a series of secondary segment wheels 80 are mounted along a drive shaft 81 below the primary segment wheels. Each of the secondary segment wheels is aligned along the first path of travel 75 for the cartons, and is located in a position to engage the cartons for redirecting the cartons along a second path of travel 82 (FIGS. 4C-4E). This second path of travel 82 extends in a different direction from and tangentially at an angle with respect to the first path of travel 75, extending through a second pinch point 83 defined at the tangent point or area wherein the carton engaging surfaces of the secondary segment wheels are rotated into alignment an/or registration with the carton engaging segments of their associated primary segment wheels, for redirecting the cartons toward the downstream carton conveyor (FIG. 1). As indicated in FIGS. 3 and 4D, the first pinch point 71 defined between the draw rollers and the carton engaging segments of the primary segment wheel and the second pinch point 83 defined between the carton engaging surfaces of the secondary segment wheel and the carton engaging segments of the primary segment wheel are separated by a cord length "CL" that is less than the length of the cartons being fed through the carton feeding system.

As illustrated in FIGS. 4A-4E, each secondary segment wheel 80 includes a carton engaging surface 85 formed or applied at least partially about the circumference of the secondary segment wheel. This carton engaging surface 85 includes a coating or covering formed from a relatively soft, non-skid, tacky or gripping surface that will enable gripping or engagement of the cartons without damage thereto. For example, the carton engaging surface of each secondary segment wheel generally can be formed from a urethane, polyurethane, rubber or other similar composite or synthetic materials or coatings. As additionally illustrated in FIG. 3, this covering material 86 will be applied substantially about the circumference of the secondary segment wheels extending from a trailing edge 87 to a point adjacent a leading or pick edge 88, of a recessed or cutout section 89 defined about each of the secondary segment wheels as indicated in FIGS. 4A-4E. In addition, the covering material 86 can extend up to, but not cover the pick edge 88 of its secondary segment wheel. Still further, the pick edge 88 can be slightly recessed so as to be at a slightly shorter radius R1 (FIGS. 4C-4D), extending from the center of drive shaft 81 to the pick edge 85, than a radius R2 that extends between the center of the drive shaft 81 and the outer surface of the covering material 86. The pick edge 88 of each secondary segment wheel also can be formed as a substantially curved or rounded projection (indicated at 91), rather than comprising a sharp corner or edge so that as the pick edge engages the leading portion of the selected carton and begins to urge the leading portion of the selected carton upwardly, it can slide or move across the surface of the carton without damaging or scraping the finish of the carton.

The drive shaft 81 for the secondary segment wheels 80 typically can be driven by the same drive motor 43 (FIG. 2) that drives the primary segment wheels 40, with the drive shaft 81 of the secondary segment wheels being linked to the drive sprocket or gear 42 of drive shaft 41 by the drive belt 45 extending thereabout. As a result, the secondary segment wheels will be rotated in timed relation with the rotation of the primary segment wheels so that the carton engaging surfaces 85 of the secondary segment wheels substantially track the rotation of the carton engaging segments of the primary segment wheels as indicated in FIGS. 4B-4E. Thus, as the leading portions of the cartons are engaged and urged upwardly by the leading or pick edges 88 of the secondary segment wheels, the cartons are engaged between the carton engaging surfaces of the secondary segment wheels and the carton engaging segments of the primary segment wheels at a second pick or pinch point 83 between the primary and secondary segment wheels, as indicated in FIGS. 4C and 4D. The selected carton is thus redirected along its second path of travel 82 and toward a pair of downstream pinch rolls 96 and 97.

As further illustrated in FIGS. 4A-4E, the radius of the secondary segment wheels generally is at a whole number ratio with respect to the radius of the carton engaging segments of the primary segment wheels, based upon the number of carton engaging segments thereof. For example, in the presently illustrated embodiment, the radius of the carton engaging surface of the secondary segment wheels is shown as being approximately half the radius of the primary segment wheels, which include two spaced carton engaging segments formed thereabout. As a result, the secondary segment wheels will rotate approximately two times for each revolution of the primary segment wheels so as to ensure that the carton engaging surfaces of the secondary segment wheels will be rotated into an engaging position so as to engage the cartons against each of the carton engaging segments of their associated primary segment wheels.

As further illustrated in FIGS. 3 and 4B, the drive shaft 81 to which the secondary segment wheels are mounted further can be supported by movable supports 98 mounted along the side frame members 17 of the frame of the carton feeding system. An actuator 99, such as a pneumatic or hydraulic cylinder, motor or other similar actuator, generally will be connected to at least one of the support plates 98 and can be selectively controlled to enable adjustment of the position or location of the secondary segment wheels with respect to the primary segment wheels. As a result, the space or gap between the primary and secondary segment wheels at which the pinch point 83 is defined can be adjusted to expand or contract this space as needed depending upon the thickness of the cartons being fed therethrough. The drive shaft of the draw rollers 66 additionally can be mounted to the adjustable support plates 98 for similar adjustment of the position of the drive rollers with respect to the primary segment wheels and thus the adjustment of the pinch points 71 defined therebetween to accommodate thicker or thinner cartons being fed.

As illustrated in FIGS. 2-3 and 4E, the downstream pinch rolls 96/97 are mounted on shafts 104 and are arranged along the second path of travel 82 of the cartons in a position to receive the cartons at a pinch point 105 defined therebetween. At least one of the downstream pinch rolls generally will be driven, typically by a drive gear 106 mounted to the end of its shaft 104 and linked to the main drive gear for the primary segment wheels by the drive belt 45 (FIG. 2) extending thereabout. Each of the pinch rolls also typically will be formed from or covered with a soft, pliable and tacky gripping surface, such as a urethane coating or other similar surface material/coating to enable the pinch rolls 96 and 97 to engage and pull the cartons therebetween. The position of the upper pinch rolls with respect to the lower pinch rolls further can be adjusted by an actuator 107, shown in FIG. 2 as including a pneumatic or hydraulic cylinder, although other types of actuators such as servomotors and/or other similar drive mechanisms also can be used, that can be engaged to adjust the position of the upper set of pinch rolls with respect to the lower set of pinch rolls to accommodate different or varying thickness cartons being drawn therebetween.

As illustrated in FIGS. 1 and 4E, the pinch rolls 96 and 97 pull the cartons individually therethrough and feed the cartons into engagement with the feed chains 110 and 111 (FIG. 1) of the downstream carton conveyor 12, with each of the cartons generally being engaged by one or more carton lugs or similar gripping/pushing mechanisms mounted to the feed chains for movement of the cartons in spaced series away from the carton feeding system 10 and to a downstream packaging machine or other similar apparatus.

In operation of the carton feeding system according to the principles of the present invention, as illustrated in FIGS. 4A-4E, the stack of cartons S typically will be initially loaded in the magazine 11. Thereafter, the vacuum cups 56 of the carton picking devices 55 are reciprocated forwardly, as indicated by arrow 63, toward an engaging position into contact with a leading portion L of a selected carton C located at the front of the stack of cartons at the pick face 26 of the magazine. As a vacuum is applied through the vacuum cups against the leading portions of the cartons, the cartons are generally engaged and substantially adhered to the vacuum cups such that as the vacuum cups are reciprocated rearwardly, in the direction of arrow 63', the selected carton is picked and begins to be pulled from the front of the stack of cartons within the magazine, generally bending and passing over the angled upper portion or end 27 of the front guide plate 24.

As indicated in FIG. 4B, as the leading portion of the selected carton is drawn forwardly by the retraction of the vacuum cups, it will be engaged by the leading edge 48 of a carton engaging segment 46 of each of the primary segment wheels 40. The rotation of the primary segment wheels generally causes the leading portion of the selected carton to be urged downwardly toward the first pinch point 71 between the carton engaging segments and associated draw rollers 66. As the carton engaging segments urge the leading portions of the cartons downwardly toward the pinch point 71, the vacuum is released or shut off, thereby releasing the vacuum cups from engagement with the selected carton, as the vacuum cups are reciprocated further rearwardly to a retracted, non-engaging position away from engagement with the carton. The selected carton thereafter is pulled from the magazine between the draw rollers and carton engaging segments of the primary segment wheels by the engagement of the carton, as indicated in FIGS. 4B and 4C, and is fed along its first path of travel indicated at 75. This first path of travel is shown as extending along a substantially downwardly oriented path or angle, and extends substantially perpendicular to or at a tangent with respect to the pinch point 71.

As indicated in FIGS. 4D and 4E, as the selected carton is moved along its first path of travel 75, the leading portion thereof is engaged by projection 91 formed at the leading edge 88 of each of the secondary segment wheels 80. As a result, the leading portion of the selected carton is redirected away from the first path of travel 75, upwardly toward a second path of travel 82 that extends through a second pinch point 83. Thereafter, the carton is engaged between the carton engaging surfaces 85 of the secondary segment wheels and the carton engaging segments 46 of the primary segment wheels, which, as they are rotated, draw the carton upwardly and along the second path of travel extending through the second pinch point 83. The selected carton is then fed along its second path of travel 82 into engagement with pinch rolls 96 and 97, which pull or draw the selected carton therebetween. The pinch rolls 96 and 97 present the selected carton to the feed chains 110/111 (FIG. 1) of the downstream carton conveyor 12, wherein, the cartons will be engaged and moved in spaced series away from the carton feeder by the downstream carton conveyor for feeding into an associated product packaging machine or other, similar apparatus.

Accordingly, it can be seen that the present invention enables the feeding and redirection of selected cartons from a stack of cartons within a carton magazine in a substantially decreased space or area, thus enabling a change in the carton's feed direction within a shorter space. This enables a decrease in the size or length of the feeder, and the design of the present system further increases the accessibility of the operative elements of the carton feeding system by relying on a minimal amount of additional necessary parts by the inclusion of the secondary segment wheels. As a result, the overall efficiency of the carton feeding system can be enhanced and improved without requiring a significant increase in the cost of construction and operation of the carton feeding system.

The foregoing description of the disclosure illustrates and describes various embodiments. As various changes can be made to the above construction without departing from the spirit and scope of the present invention as disclosed herein, it is intended that all matter contained in the above description or shown in the accompanying drawings shall be interpreted as illustrative and not in a limiting sense. Furthermore, the scope of the present disclosure shall be construed to cover various modifications, combinations, alterations, etc., of the above-described embodiments that are within the scope of the claims of this application.

Additionally, while the disclosure shows and describes selected embodiments of the present invention, the invention is capable of use in various other combinations, modifications, and environments, and is capable of undergoing a variety of changes or modifications than the scope of the inventive concepts as expressed herein, commensurate with the above teachings, and/or within the skill or knowledge of the relevant art. Furthermore, various features and characteristics of each embodiment may be selectively interchanged and applied to the other illustrated and non-illustrated embodiments of the disclosure.

The invention claimed is:

1. A carton feeder, comprising:
a magazine for presenting a stack of cartons;
a primary segment wheel having at least one carton engaging segment defined therealong, the at least one carton engaging segment comprises a recessed area defined by a leading edge, and wherein the leading edge is adapted to engage and urge a leading portion of a selected carton from the stack of cartons of the magazine;
a draw roller adjacent the magazine and spaced from the primary segment wheel a distance adapted to enable the selected carton of the stack of cartons to be engaged at a fist pinch point between the draw roller and the at least one carton engaging segment of the primary segment wheel for drawing the selected carton from the stack of cartons within the magazine and moving the selected carton along a first path of travel, the first path of travel being in a first direction passing through the first pinch point between the draw roller and the primary segment wheel; and
a secondary segment wheel positioned along the first path of travel adjacent the draw roller, the secondary segment wheel spaced from the draw roller in a position to receive the selected carton moving in the first direction and engaged between the draw roller and carton engaging element of the primary segment wheel and including a carton engaging surface rotatable into alignment with the carton engaging segment of the primary segment wheel for engaging the selected carton therebetween at a second pinch point;
whereby the selected carton is engaged at the second pinch point between the carton engaging surface of the secondary segment wheel and the carton engaging segment of the primary segment wheel to redirect the selected carton along a second path of travel in a second direction passing through the second pinch point, the second direction differs from the first direction of the first path of travel of the selected carton.

2. The carton feeder of claim 1, wherein the secondary segment wheel further comprises a recessed area opposite the carton engaging surface and defined by a leading edge and a trailing edge, and wherein the leading edge is adapted to engage and urge a leading portion of the selected carton toward a pinch point between the carton engaging segment of the primary segment wheel and the carton engaging surface of the secondary segment wheel.

3. The carton feeder of claim 1, wherein the primary segment wheel is driven at a first rotational rate, and the secondary segment wheel is driven at a second rotational rate so as to cause the selected carton to be engaged between the at least one carton engaging segment of the primary segment wheel and the carton engaging surface of the secondary segment wheel.

4. The carton feeder of claim 1, wherein the carton engaging surface of the secondary segment wheel comprises a substantially non-skid gripping surface.

5. The carton feeder of claim 4, wherein the gripping surface comprises a layer of urethane, polyurethane or rubber.

6. The carton feeder of claim 1 and further comprising a suction device moveable into engagement with the stack of cartons in the magazine for picking and removing cartons therefrom.

7. The carton feeder of claim 1 and further comprising a pair of pinch rolls arranged along the second path of travel for receiving and moving the selected carton along the second path of travel and to a downstream carton conveyor.

8. The carton feeder of claim 1 and further comprising a cord length defined between a first tangent point at which the selected carton is engaged between the draw roller and the primary segment wheel and a second tangent point at which the selected carton is engaged between the primary segment wheel and the secondary segment wheel, and wherein the cord length is less than a length of the cartons being fed through the carton feeder.

9. The carton feeder of claim 1 and further comprising a moveable support frame supporting the secondary segment wheel, and an actuator for moving the support frame to adjust a spacing of the carton engaging surface of the secondary segment wheel from the at least one carton engaging segment of the primary segment wheel.

10. A method of feeding wrap style cartons from a stack of cartons within a magazine to a downstream carton conveyor, comprising;
picking and removing a selected carton from the magazine;
engaging a leading portion of the selected carton between a carton engaging segment of a primary segment wheel and a draw roller and directing the selected carton along a first path of travel, the first path of travel being in a first direction passing through a first pinch point between the draw roller and the primary segment wheel, wherein the carton engaging segment comprises a recessed area defined by a leading edge;
drawing the selected carton along the first path of travel in the first direction through the first pinch point between the draw roller and the carton engaging segment of the primary segment wheel, the drawing the selected carton comprises engaging the leading edge of the primary segment wheel with the leading portion of the selected carton;
as the selected carton is fed along the first path of travel by the draw roller and the carton engaging segment of the primary segment wheel, engaging the leading portion of the selected carton with a carton engaging surface formed along a secondary segment wheel, the secondary segment wheel being positioned along the first path of travel;

redirecting the leading portion of the selected carton away from the first path of travel along a second path of travel extending in a second direction tangentially with respect to the first path of travel and into engagement between the carton engaging surface of the secondary segment wheel and the carton engaging segment of the primary segment wheel, the second path of travel extending through a second pinch point between the carton engaging surface of the secondary segment wheel and the carton engaging segment of the primary segment wheel; and as the selected carton is moved in the second direction of the second path of travel, passing the selected carton to the downstream carton conveyor.

11. The method of claim 10 and further comprising engaging the selected carton with feed chains moving along the downstream carton conveyor for conveying the selected carton along its second path of travel.

12. The method of claim 10 and wherein removing the selected carton from the magazine comprises moving a suction device into engagement with the selected carton, applying a suction force to the selected carton, and drawing a portion of the selected carton into engagement between the draw roll and the carton engaging segment of the primary segment wheel.

13. The method of claim 1, wherein redirecting the leading portion of the selected carton comprises engaging the leading portion of the selected carton with a pick edge of the secondary segment wheel adjacent the carton engaging surface and urging the leading portion of the carton toward the second path of travel and away from the first path of travel.

14. The method of claim 10, wherein passing the selected carton to the downstream carton conveyor comprises feeding the leading portion of the selected carton along its second path of travel into engagement with a pair of pinch rolls, drawing the selected carton through a third pinch point between the pinch rolls, second path of travel extending in the second direction passes through the third pinch point, and moving the selected carton into engagement with feed chains moving along the downstream carton conveyor.

15. A system for feeding cartons from a stack of cartons to a carton conveyor for a packaging machine, comprising:
a magazine receiving the stack of cartons therein;
a carton picking device moveable into engagement with the stack of cartons for picking a leading portion of a selected carton therefrom;
a draw roller adjacent the magazine for receiving the selected carton of the stack of cartons and moving the selected carton along a first path of travel;
at least one primary segment wheel downstream from the magazine and movable to a position to engage the selected carton at a first pinch point between the draw roller and the at least one primary segment wheel as the selected carton is drawn from the stack of cartons by the carton picking device and into engagement with the draw roller, the at least one primary segment wheel having a carton engaging segment comprising a recessed area defined by a leading edge for engaging and urging the leading portion of the selected carton along the first path of travel, the first path of travel being in a first direction passing through the first pinch point between the draw roller and the primary segment wheel; and
at least one secondary segment wheel positioned along the first path of travel downstream from the first pinch point and having a recessed area defined by a leading edge and a trailing edge, wherein the leading edge is adapted to engage and redirect the selected carton moving in the first direction along a second path of travel extending in a second direction tangentially away from the first path of travel and through a second pinch point defined between the at least one primary segment wheel and at least one secondary segment wheel for feeding the selected carton to the carton conveyor.

16. The system of claim 15 and wherein the secondary segment wheel further comprises a carton engaging surface defined about a portion of an outer circumference of the at least one secondary segment wheel opposite the recessed area, a recessed area defined by a leading edge and a trailing edge, wherein the leading edge is adapted to engage and urge the selected carton pinch point.

17. The system of claim 16 and wherein the carton engaging surface of the at least one secondary segment wheel comprises a substantially non-skid gripping surface.

18. The system of claim 16 and wherein the at least one primary segment wheel is driven at a first rotational rate, and the at least one secondary segment wheel is driven at a second rotational rate so as to cause the selected carton to be engaged between at least one carton engaging segment of the at least one primary segment wheel and the carton engaging surface of the at least one secondary segment wheel.

19. The system of claim 18 and wherein the carton engaging surface of the at least one secondary segment wheel comprises a substantially non-skid gripping surface.

20. The system of claim 15 wherein the draw roller is adjacent the at least one primary segment wheel at the first pinch point, and wherein the at least one carton engaging segment of the at least one primary segment wheel is rotatable into engagement with the selected carton with the selected carton being engaged and drawn between the draw roller and at least one carton engaging segment at the first pinch point.

21. The system of claim 20 and further comprising a cord length defined between the first pinch point at which the selected carton is engaged between the draw roller and the primary segment wheel and the second pinch point at which the selected carton is engaged between the primary segment wheel and the secondary segment wheel, and wherein the cord length is less than a length of the cartons being fed through the carton feeder.

22. The system of claim 15, wherein the carton picking device comprises a vacuum cup mounted on a reciprocating arm moveable between non-engaging and engaging positions in timed relation with rotation of the at least one primary segment wheel toward engagement with the selected carton.

23. The carton feeder of claim 1, wherein the recessed area of the at least one carton engaging segment of the primary segment wheel is adapted to engage and urge the leading portion of the selected carton towards the draw roller.

24. The carton feeder of claim 1, wherein the leading edge of the recessed area of the at least one carton engaging segment of the primary segment wheel is rounded, and wherein the recessed area is further defined by a substantially flat trailing edge spaced apart from the leading edge.

25. The carton feeder of claim 1, wherein the primary segment wheel includes at least two carton engaging segments formed substantially opposite one another, each of the carton engaging segments of the at least two carton engaging segments including a substantially arcuate construction having a rounded leading edge adapted to engage and urge a leading portion of the selected carton.

26. The carton feeder of claim 25, wherein each carton engaging segment of the primary segment wheel further includes a substantially smooth, non-skid outer surface adapted to engage the cartons without marring or damaging their finish.

27. The carton feeder of claim 25, wherein each carton engaging segment of the primary segment wheel is further defined by a substantially flat trailing edge spaced apart from the rounded leading edge.

\* \* \* \* \*